US006539718B2

(12) United States Patent
Bronicki et al.

(10) Patent No.: US 6,539,718 B2
(45) Date of Patent: Apr. 1, 2003

(54) METHOD OF AND APPARATUS FOR PRODUCING POWER AND DESALINATED WATER

(75) Inventors: Lucien Y. Bronicki, Yavne; Uriyel Fisher, Haifa, both of (IL)

(73) Assignee: Ormat Industries Ltd., Yavne (IL)

( * ) Notice: Subject to any disclaimer, the term of this patent is extended or adjusted under 35 U.S.C. 154(b) by 0 days.

(21) Appl. No.: 09/871,698

(22) Filed: Jun. 4, 2001

(65) Prior Publication Data

US 2002/0178723 A1 Dec. 5, 2002

(51) Int. Cl.[7] ................................................ F03G 7/00
(52) U.S. Cl. ..................... 60/641.2; 60/641.7; 60/651; 60/671
(58) Field of Search ............................ 60/641.2, 641.7, 60/651, 671

(56) References Cited

U.S. PATENT DOCUMENTS

| | | | | |
|---|---|---|---|---|
| 4,157,014 A | * | 6/1979 | Clark, Jr. ...................... 60/655 |
| 4,283,211 A | * | 8/1981 | Ehrlich et al. .................... 62/4 |
| 4,315,402 A | * | 2/1982 | Sadhukhan ................ 60/641.3 |
| 5,582,690 A | * | 12/1996 | Weinberger et al. .......... 203/10 |
| 6,301,894 B1 | * | 10/2001 | Halff ......................... 60/641.2 |

* cited by examiner

Primary Examiner—Hoang Nguyen
(74) Attorney, Agent, or Firm—Nath & Associates PLLC; Gary M. Nath; Jerald L. Meyer

(57) ABSTRACT

Apparatus for producing power and desalinated water from geothermal fluid according to the present invention comprises: a geothermal power plant that produces power from geothermal fluid supplied thereto; means for supplying sea water to the condenser of said geothermal power plant that produces heated sea water; and a desalination plant to which the heated sea water is supplied and which produces drinking water. Preferably, the geothermal power plant that produces power comprises an organic Rankine cycle geothermal power plant that produces power. Alternatively, the geothermal power plant that produces power comprises an organic combined cycle Rankine cycle geothermal power plant that produces power. In a further alternative, the geothermal power plant that produces power comprises a closed cycle steam geothermal power plant that produces power. In a still further alternative, the geothermal power plant that produces power comprises an ammonia cycle geothermal power plant that produces power. As far as the desalination plant is concerned, the desalination plant preferably comprises a multi-flash desalination plant. In an alternative, the desalination plant comprises a reverse osmosis desalination plant.

20 Claims, 8 Drawing Sheets

METHOD OF AND APPARATUS FOR PRODUCING POWER AND DESALINATED WATER

DESCRIPTION

1. Technical Field

This invention relates to a method of and apparatus for producing power and desalinated water, and more particularly, to a method of and apparatus for producing power and desalinated water from geothermal fluid.

2. Background of the Invention

Recently, new requirements to provide electric power in an environmentally friendly manner and to supply fresh water have become more important. Usually methods and apparatus to produce electricity use fuels that produce pollution and are expensive. In addition, isolated locations such as islands also are very sensitive to pollution and often have reduced availability of fresh water.

It is therefore an object of the present invention to provide a new and improved method of and apparatus for producing power and desalinated water wherein the disadvantages as outlined are reduced or substantially overcome.

SUMMARY OF THE INVENTION

Apparatus for producing power and desalinated water from geothermal fluid according to the present invention comprises: a geothermal power plant that produces power from geothermal fluid supplied thereto; means for supplying sea water to the condenser of said geothermal power plant that produces heated sea water; and a desalination plant to which the heated sea water is supplied and which produces desalinated or drinking water. Preferably, the geothermal power plant that produces power comprises an organic Rankine cycle geothermal power plant that produces power. Alternatively, the geothermal power plant that produces power comprises an organic combined cycle Rankine cycle geothermal power plant that produces power. In a further alternative, the geothermal power plant that produces power comprises a closed cycle steam geothermal power plant that produces power. In a still further alternative, the geothermal power plant that produces power comprises an ammonia cycle geothermal power plant that produces power. As far as the desalination plant is concerned, the desalination plant preferably comprises a multi-flash desalination plant. In a alternative, the desalination plant comprises a reverse osmosis desalination plant.

BRIEF DESCRIPTION OF THE DRAWINGS

Embodiments of the present invention are described by way of example, and with reference to the accompanying drawings wherein.

Like reference numerals and designations in the various drawings refer to like elements.

DETAILED DESCRIPTION

Figure 1:
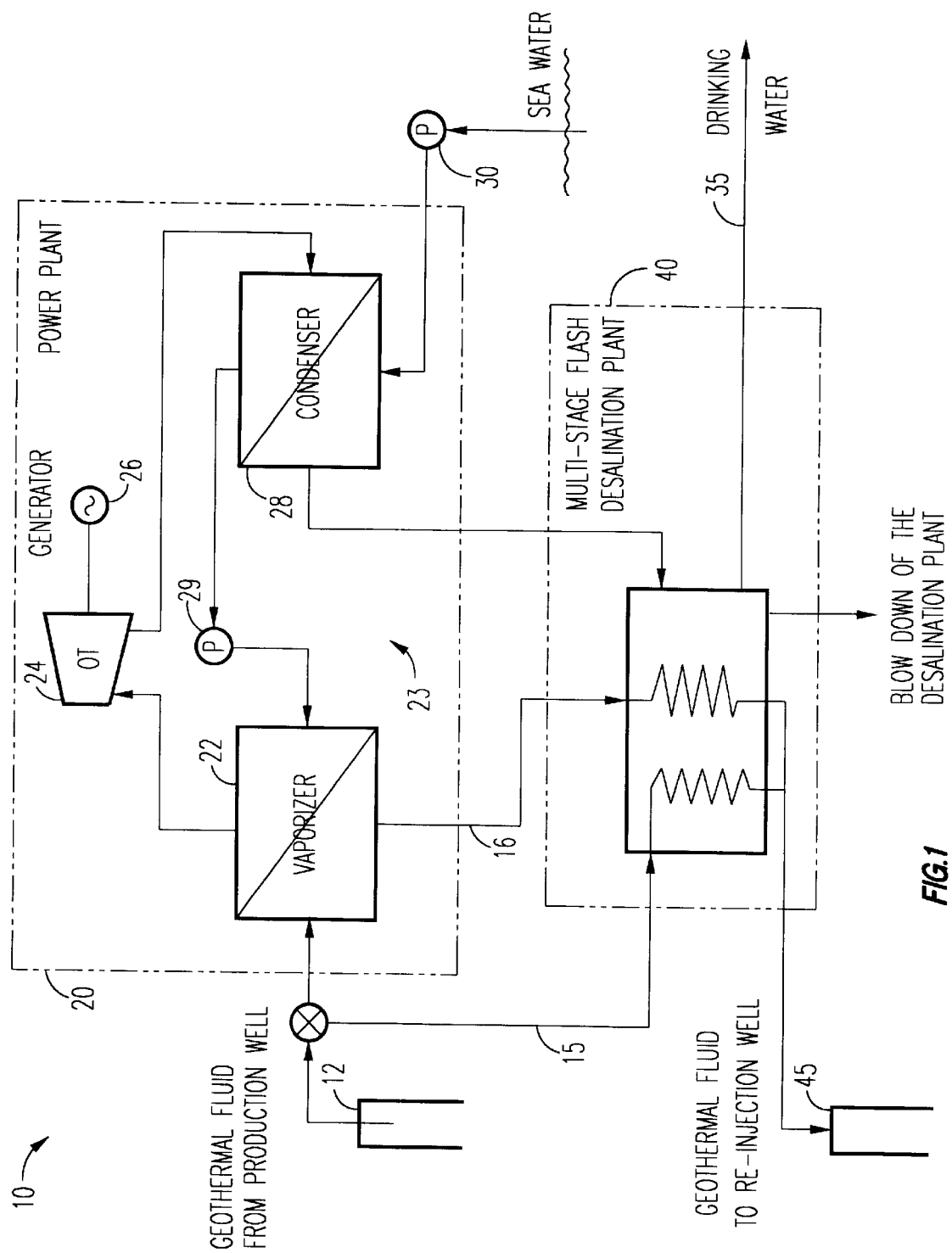
FIG. 1 is a schematic diagram of a combined geothermal power and desalination plant constructed and arranged in accordance with the present invention.

Referring now to FIG. 1, reference numeral 10 designates a combined geothermal power and desalination plant constructed and arranged in accordance with the present invention. Plant 10 comprises geothermal power plant 20, receiving geothermal fluid from production well 12, extracting geothermal fluid from a water dominated low enthalpy geothermal resource, and producing power, and desalination plant 40 producing desalinated or drinking water 35. Geothermal power plant 20 includes vaporizer 22, contained in an organic Rankine cycle turbine power plant 23, for producing organic working fluid vapor from heat contained in the geothermal fluid supplied thereto and from which heat depleted geothermal fluid exists. The organic working fluid vapor produced is supplied organic vapor turbine 24 where it expands and produces power and from which expanded organic working fluid vapor exists. Preferably, organic vapor turbine 24 drives electric generator 26 that produces electricity. The expanded organic working fluid vapor is supplied to condenser 28 that is cooled by sea water supplied thereto via pump 30 and produces organic working fluid condensate and heated sea water. Organic working fluid condensate is supplied to vaporizer 22 using cycle pump 29. Heated sea water exiting condenser 28 is supplied to multi-flash desalination plant 40 for producing drinking water 35. In addition, portion of geothermal fluid, in line 15, exiting production well 12 as well as heat depleted geothermal fluid, in line 16, exiting vaporizer 22 is supplied to multi-stage desalination plant 40.

In operation, portion of geothermal fluid exiting production well 12 is supplied to vaporizer 22 that produces organic working fluid vapor and from which heat depleted geothermal fluid exists. The organic working fluid vapor is supplied to organic vapor turbine 24 wherein it expands and turbine 24 preferably drives electric generator 26 that produces electricity. Expanded organic working fluid vapor exiting turbine 24 is supplied to condenser 28 that is cooled by sea water supplied by pump 30 and organic working fluid condensate is produced with heated sea water exiting condenser 28. Organic working fluid condensate exiting condenser 28 is supplied to vaporizer 22 using cycle pump 29. Heated sea water exiting condenser 28 as well as portion of geothermal fluid, in line 15, exiting production well 12 and heat depleted geothermal fluid, in line 16, is supplied to multi-stage or flash desalination plant 40 that produces desalinated or drinking water 35. Geothermal fluid and further depleted geothermal fluid exiting multi-stage flash desalination plant 40 is preferably injected into re-injection well 45.

While geothermal power plant 20 is shown in FIG. 1 as an organic Rankine cycle turbine plant, geothermal power plant 20 can be a closed cycle steam turbine plant. Moreover, if preferred, geothermal power plant 20 can be an ammonia cycle geothermal power plant.

Figure 2:
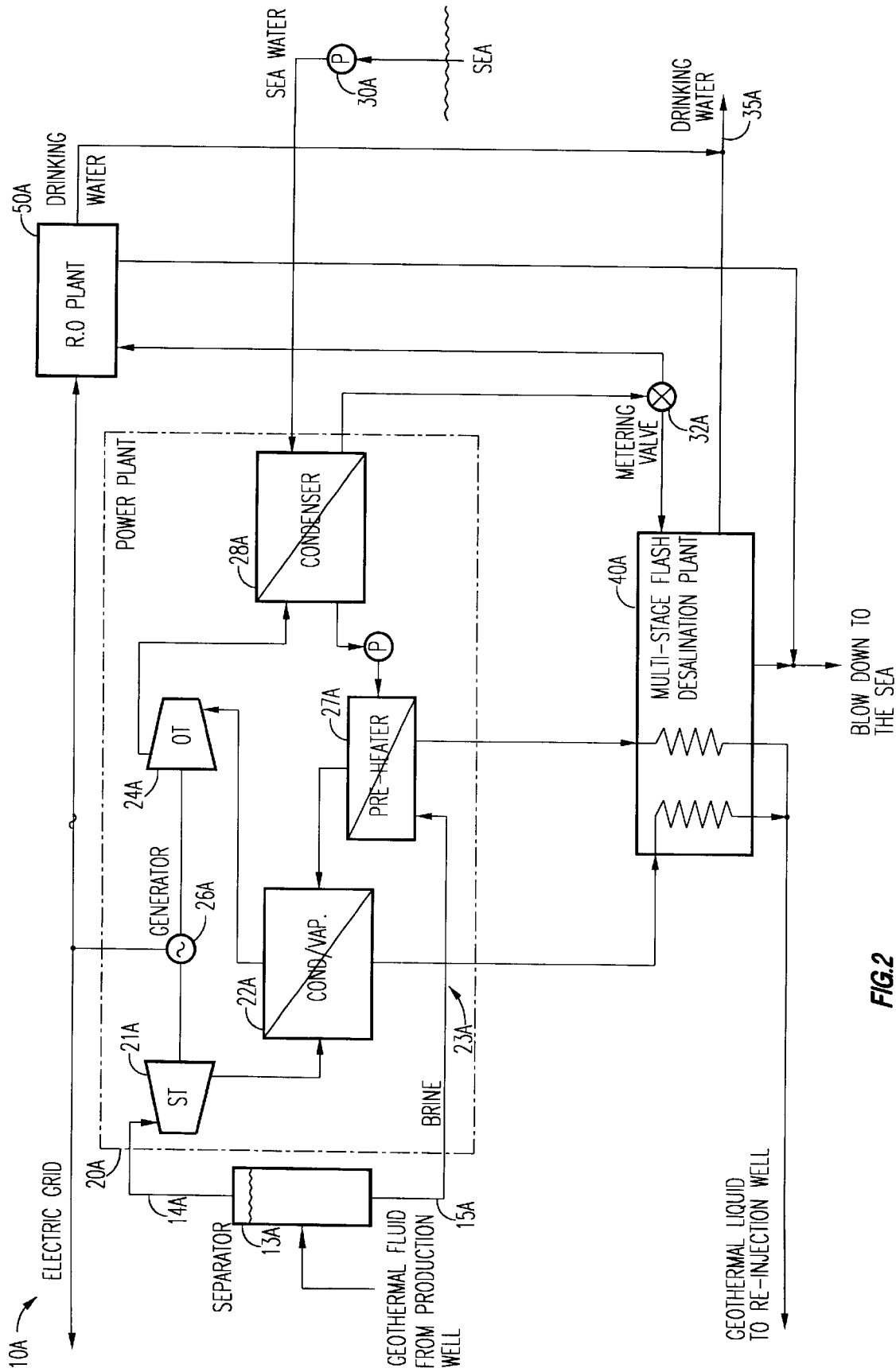
FIG. 2 is a schematic diagram of a further combined geothermal power and desalination plant constructed and arranged in accordance with the present invention.

Turning to FIG. 2, numeral 10A designates a further combined geothermal power and desalination plant constructed and arranged in accordance with the present invention. Plant 10A comprises geothermal power plant 20A, receiving geothermal fluid derived from a production well, extracting geothermal fluid from a high temperature two phase geothermal resource, and producing power, and desalination plant 40A producing desalinated or drinking water 35A. In this embodiment, geothermal fluid from the production well is supplied to separator 13A that separates the geothermal fluid into geothermal steam in line 14A and geothermal liquid or brine in line 15A. Geothermal power plant 20A includes steam turbine 21A that receives geothermal steam in line 14A that expands therein. Steam turbine 21A produces power and preferably drives electric generator 26A that produces electricity. The expanded steam exiting the steam turbine is supplied to condenser/vaporizer 22A, portion of organic combined cycle Rankine cycle turbine unit 23A, and that is cooled by organic working fluid, and wherein the expanded steam condenses and organic working fluid vapor and steam condensate is produced. Organic working fluid vapor is supplied to organic vapor turbine 24A wherein it expands and turbine 24A produces power. Preferably, organic vapor turbine 24A drives an electric generator, such as electric generator 26A, that produces electricity and expanded organic working fluid vapor is supplied to organic working fluid condenser 28A, cooled by sea water supplied by pump 30A, wherein it condenses. Electric generator 26A is preferably interposed between steam turbine 21A and organic vapor turbine 24A. However, if preferred, separate electric generators can be used. Organic working fluid condensate exiting condenser 28A is supplied to pre-heater 27A using cycle pump 29A wherein it receives heat from geothermal liquid of brine from line 15A and pre-heated organic working fluid is supplied from the pre-heater to condenser/vaporizer 22A. Heat depleted geothermal liquid or brine exiting pre-heater 27A as well as steam condensate exiting condenser/vaporizer 22A are supplied to multi-stage or flash desalination plant 40A. Furthermore, heated sea water exiting organic working fluid condenser 28A is supplied to metering valve 32A from which portion of the heated sea water is supplied to multi-stage or flash desalination plant 40A and a further portion is supplied to reverse osmosis desalination plant 50A both of which produce desalinated or drinking water 35A. In accordance with the present invention, reverse osmosis desalination plant 50A preferably receives portion of the electricity produced by electric generator 26A. Reverse osmosis desalination plant 50A operates such that pressure provided to liquid, brine or sea water from which drinking water is to be extracted is in excess of its osmotic pressure. By so doing, the fresh water content in this liquid will permeate through a semi-permeable membrane towards the freshwater or drinking water side in exactly the reverse direction as occurs in the osmosis phenomenon. Blow down from multi-stage or flash desalination plant 40A and from reverse osmosis desalination plant 50A are supplied to the sea.

Figure 3:
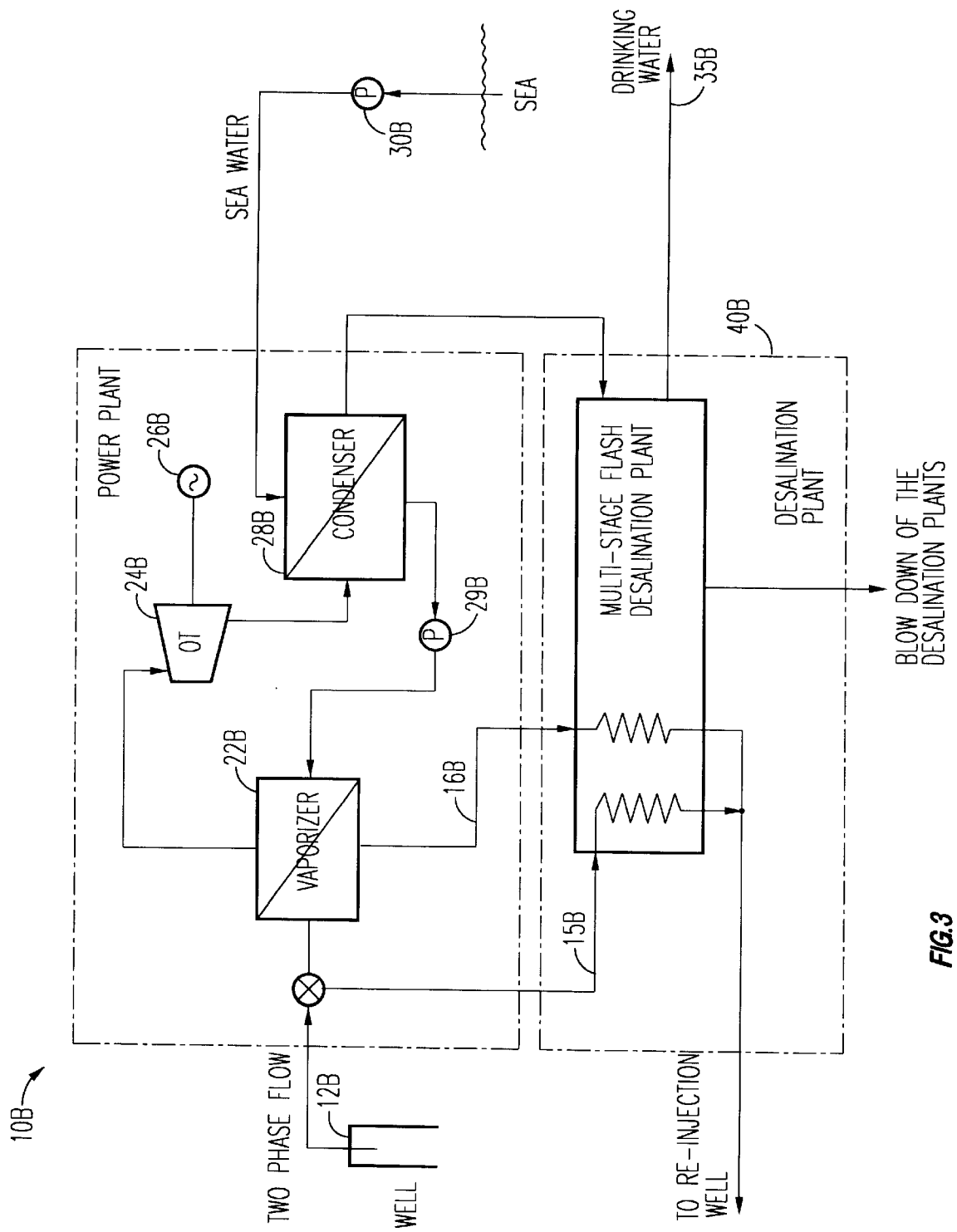
FIG. 3 is a schematic diagram of another combined geothermal power and desalination plant constructed and arranged in accordance with the present invention.

As far as FIG. 3 is concerned, numeral 10B designates another combined geothermal power plant and desalination plant constructed and arranged in accordance with the present invention. Plant 10B comprises geothermal power plant 20B, receiving geothermal fluid from production well 12B, extracting geothermal fluid from a substantially pure steam geothermal resource, and producing power, and desalination plant 40B producing desalinated or drinking water 35B. Geothermal power plant 20B includes vaporizer 22B, contained in an organic Rankine cycle turbine power plant 23B, for producing organic working fluid vapor from heat contained in geothermal fluid supplied thereto and from which heat depleted geothermal fluid exists. The organic working fluid vapor produced is supplied organic vapor turbine 24 where it expands and produces power and from which expanded organic working fluid vapor exists. Preferably, organic vapor turbine 24B drives electric generator 26B that produces electricity. The expanded organic working fluid vapor is supplied to condenser 28B that is cooled by sea water supplied thereto via pump 30B and produces organic working fluid condensate and heated sea water. Organic working fluid condensate is supplied to vaporizer 22B using cycle pump 29B. Heated seal water exiting condenser 28B is supplied to multi-stage or flash desalination plant 40B for producing desalinated or drinking water 35B. In addition, portion of geothermal fluid, in line 15B, exiting production well 12B as well as heat depleted geothermal fluid, in line 16B, exiting vaporizer 22 is supplied to multi-stage or flash desalination plant 40B.

In operation, portion of geothermal fluid exiting production well 12B is supplied to vaporizer 22B that produces organic working fluid vapor and from which heat depleted geothermal fluid exists. The organic working fluid vapor is supplied to organic vapor turbine 24B wherein it expands and turbine 24 preferably drives electric generator 26B that produces electricity. Expanded organic working fluid vapor exiting turbine 24B is supplied to condenser 28B that is cooled by sea water supplied by pump 30B and organic working fluid condensate is produced with heated sea water exiting condenser 28B. Organic working fluid condensate exiting condenser 28B is supplied to vaporizer 22B using cycle pump 29B. Heated sea water exiting condenser 28B as well as portion of geothermal fluid, in line 15B, exiting production well 12B and heated depleted geothermal fluid, in line 16B, is supplied to multi-stage or flash desalination plant 40B that produces desalinated or drinking water 35B. Blow down from this desalination plant is disposed with. Geothermal fluid and further depleted geothermal fluid exiting multi-stage or flash desalination plant 40 is preferably injected into a re-injection well.

Figure 4:
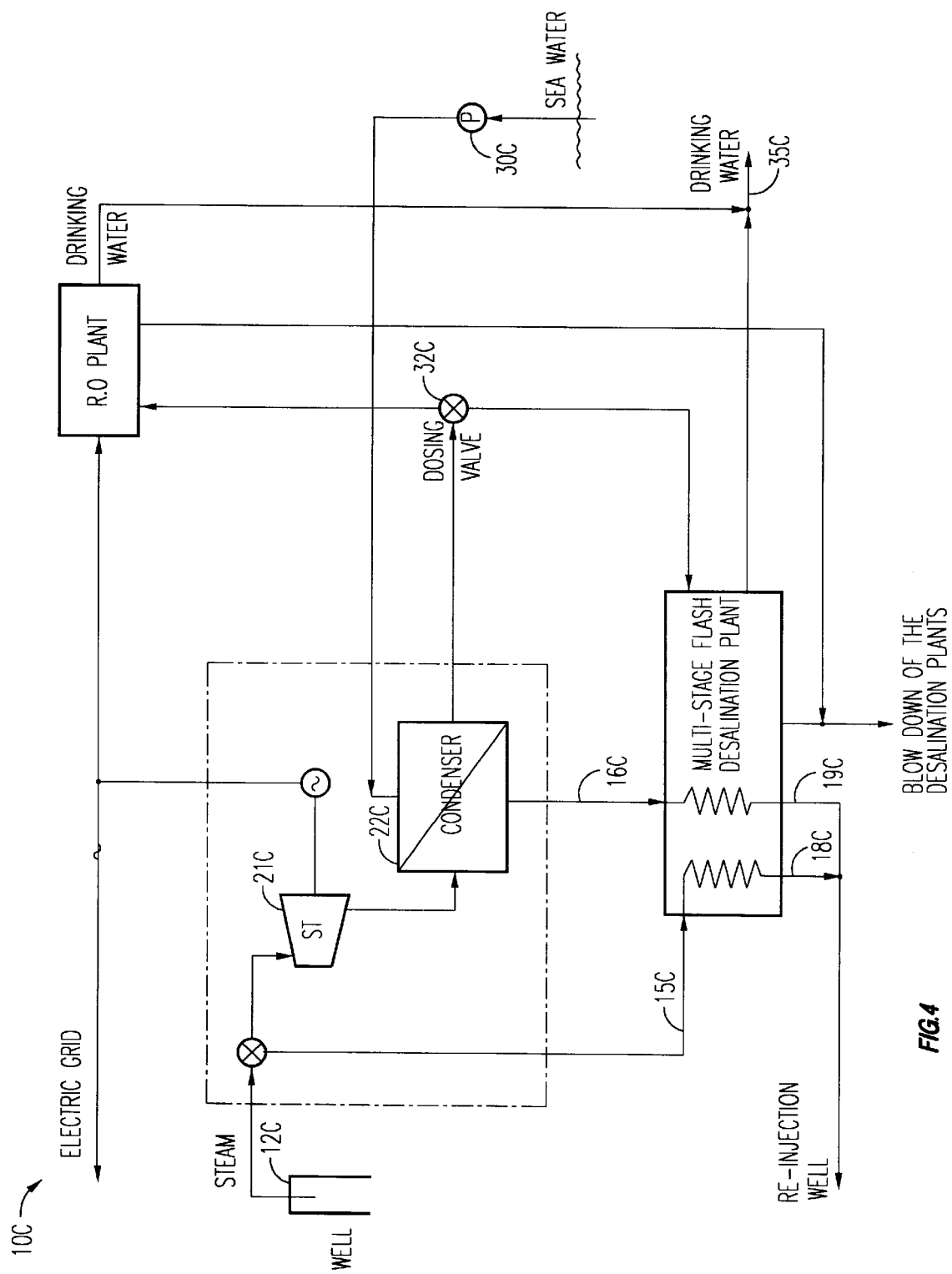
FIG. 4 is a schematic diagram of a still further combined geothermal power and desalination plant constructed and arranged in accordance with the present invention.

Numeral 10C of FIG. 4, to which reference is now made, designates a still further combined geothermal power plant and desalination plant constructed and arranged in accordance with the present invention. In this embodiment, portion of the geothermal steam exiting production well 12C, extracting geothermal fluid from a medium enthalpy substantially pure steam geothermal resource, is supplied to steam turbine 21C, included in power plant 20C, wherein it expands and power is produced, the expanded steam being supplied to condenser 22C. Steam turbine 21C preferably drives electric generator 26C and produces electricity that is supplied to the electric grid. Expanded steam exiting turbine 21C is supplied to steam condenser 22C that is cooled by sea water supplied by pump 30C and steam condensate is produced. Heated sea water exiting steam condenser 22C is supplied to metering valve 32C that supplies portion of the heated sea water to multi-stage or flash desalination plant 40C and a further portion to reverse osmosis desalination plant 50C. In addition, steam condensate exiting steam condenser 22C and a further portion of geothermal steam exiting production well is also supplied to multi-stage or flash desalination plant 40C. In accordance with the present invention, reverse osmosis desalination plant 50C preferably receives portion of the electricity produced by electric generator 26C. Heated contained in these fluids is utilized in multi-stage or flash desalination plant and desalinated or drinking water 35C is produced from both desalination plants 40C and 50C. Blow down from these desalination plants is disposed with. Heated depleted steam condensate in line 49C and heated depleted geothermal steam or geothermal steam condensate in line 18C exiting multi-flash desalination plant 40C is preferably supplied to a re-injection well.

Figure 5:
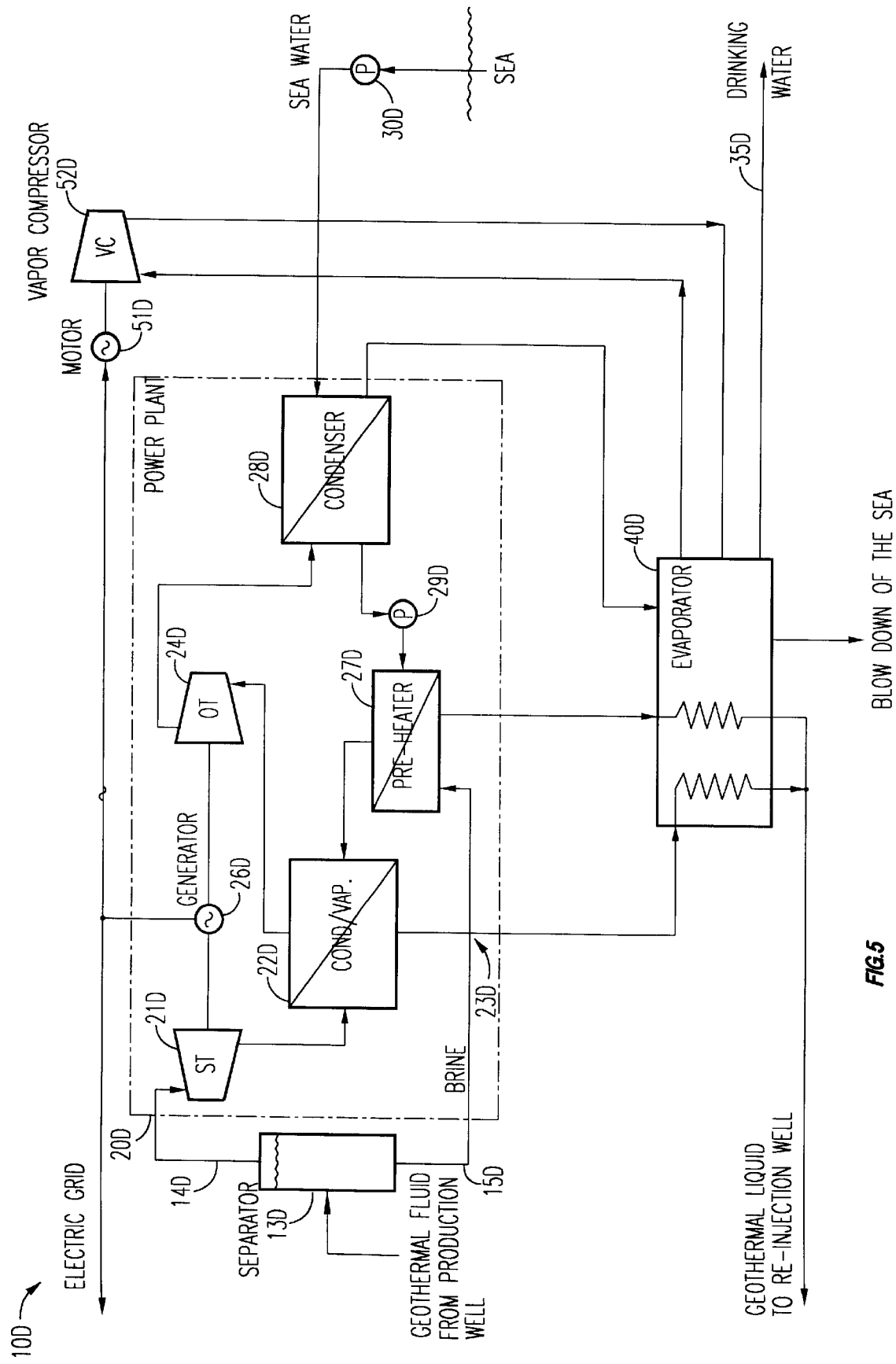
FIG. 5 is a schematic diagram of an additional combined geothermal power and desalination plant constructed and arranged in accordance with the present invention.

Turning to FIG. 5, numeral 10D designates an additional combined geothermal power and desalination plant constructed and arranged in accordance with the present invention. Plant 10D comprises geothermal power plant 20D, receiving geothermal fluid derived from a production well, extracting geothermal fluid from a high temperature two phase geothermal resource, and producing power, and desalination plant 40D producing desalinated or drinking water 35D. In this embodiment, geothermal fluid from the production well is supplied to separator 13D that separates the geothermal fluid into geothermal steam in line 14D and geothermal liquid or brine in line 15D. Geothermal power plant 20D includes steam turbine 21D that receives geothermal steam in line 14D that expands therein. Steam turbine 21D produces power and preferably drives electric generator 26D that produces electricity. The expanded steam exiting the steam turbine is supplied to condenser/vaporizer 22D, portion of organic combined cycle Rankine cycle turbine unit 23D, and cooled by organic working fluid, and wherein the expanded steam condenses and organic working fluid vapor and steam condensate is produced. Organic working fluid is supplied to organic vapor turbine 24A wherein it expands and turbine 24D produces power. Preferably, organic vapor turbine 24D drives an electric generator, such as electric generator 26D, that produces electricity and expanded organic working fluid vapor is supplied to organic working fluid condenser 28D, cooled by sea water supplied by pump 30D, wherein it condenses. Electric generator 26D is preferably interposed between steam turbine 21D and organic vapor turbine 24D. However, if preferred, separate electric generators can be used. Organic working fluid condensate exiting condenser 28D is supplied to pre-heater 27D using cycle pump 29D wherein it receives heat from geothermal liquid or brine from line 15D and pre-heated organic working fluid is supplied from the pre-heater to condenser/vaporizer 22D. Heat depleted geothermal liquid or brine exiting pre-heater 27D as well as steam condensate exiting condenser/vaporizer 22D are supplied to desalination plant 40D. Furthermore, heated sea water exiting organic working fluid condenser 28D is supplied to evaporator 40D, portion of the desalination plant. Water vapor produced by evaporator 40D is supplied to vapor compressor 52D, also portion of the desalination plant, wherein it is compressed. The compressed water is then supplied to evaporator 40D such that desalinated or drinking water 35D is produced. In accordance with the present invention, motor 51D driving vapor compressor 52D preferably receives portion of the electricity produced by electric generator 26D. Blow down from the desalination plant is supplied to the sea.

Figure 6:
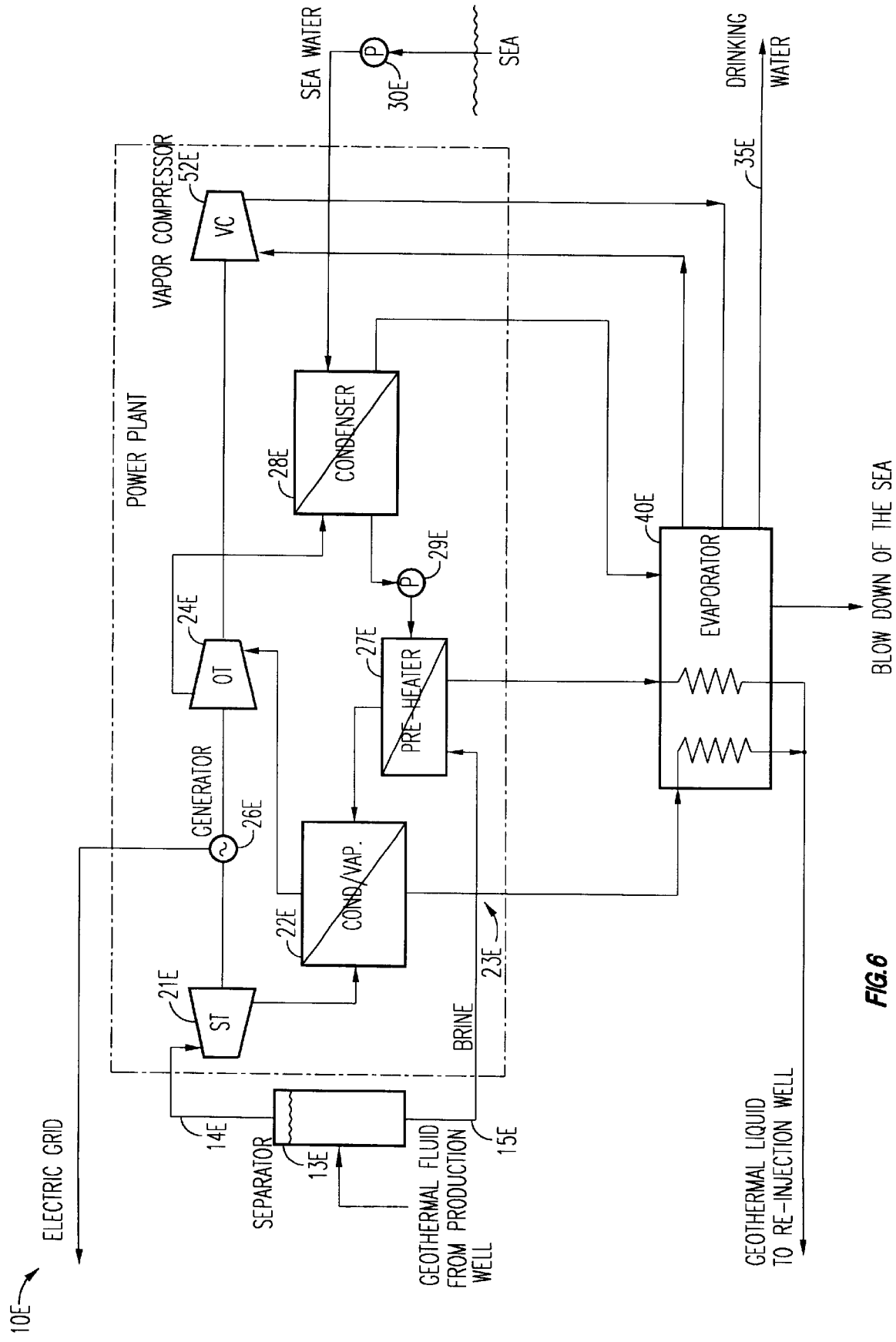
FIG. 6 is a schematic diagram of yet an additional combined geothermal power and desalination plant constructed and arranged in accordance with the present invention.

As far as FIG. 6 is concerned, numeral 10E designates yet an additional combined geothermal power and desalination plant constructed and arranged in accordance with the present invention. In actual fact, the embodiment shown in FIG. 6 is very similar to the embodiment described with reference to FIG. 6 is very similar to the embodiment described with reference to FIG. 5. However, in the present embodiment, vapor compressor 52E, portion of the desalination plant, is driven directly by organic vapor turbine 24E. Alternatively, vapor compressor 52E can be driven by steam turbine 21E. Apart from that, the rest of the embodiment is the same as that described with reference to FIG. 5. In a still further alternative, related to this embodiment, a standby diesel engine or gas engine can be connected to steam turbine 21E or organic vapor turbine 24E via a suitable clutch. Furthermore, the relative and absolute component sizing can be adopted to suit the specific geothermal resource and water/electricity requirements.

Figure 7:
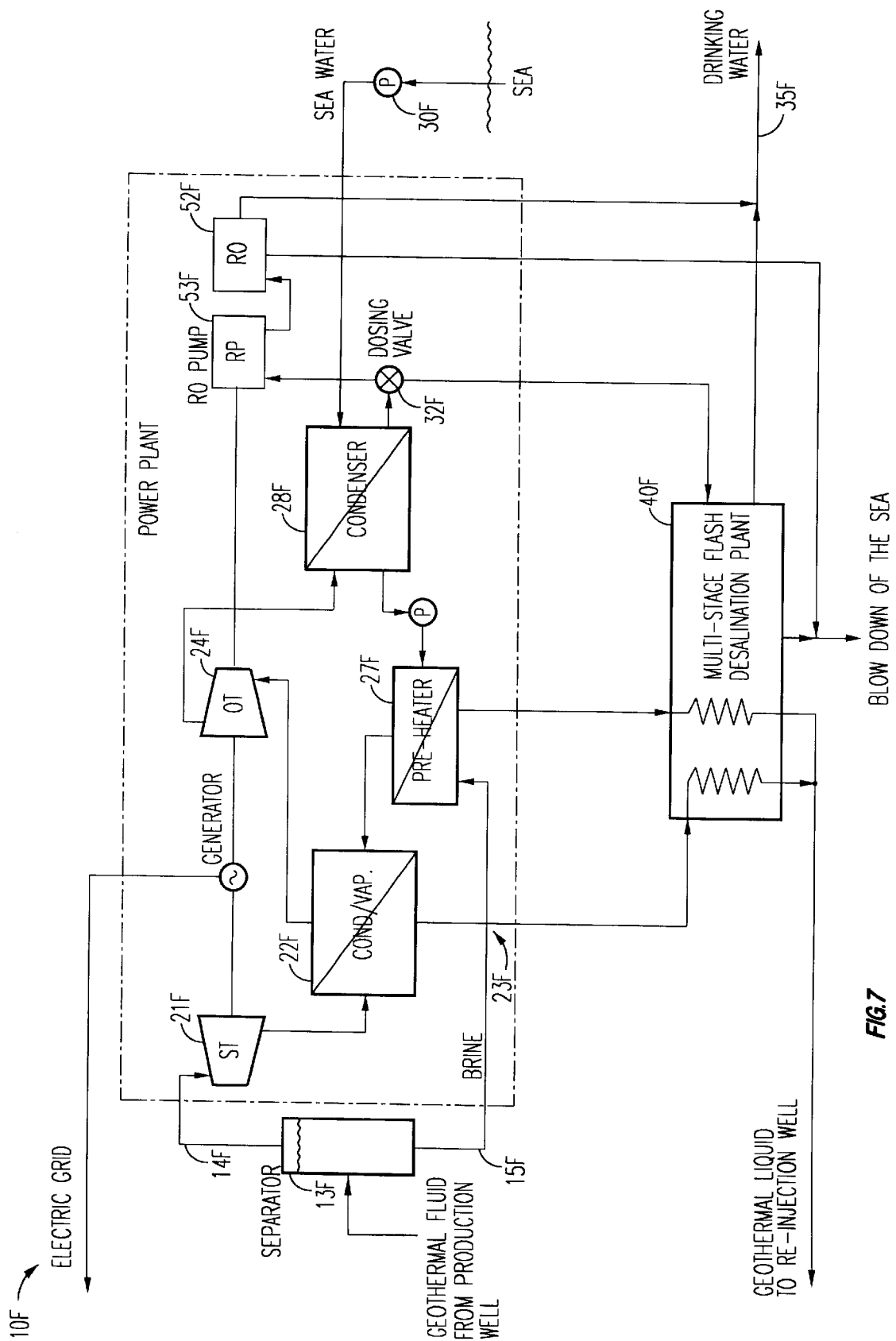
FIG. 7 is a schematic diagram of still another combined geothermal power and desalination plant constructed and arranged in accordance with the present invention.

Numeral 10F of FIG. 7, to which reference is now made, designates still another combined geothermal power and desalination plant constructed and arranged in accordance with the present invention. The embodiment described with reference to FIG. 6 is very similar to the embodiment described with reference to FIG. 2. However, in the present embodiment, revere osmosis pump 53F that supplies portion of heated sea water exiting organic working fluid condenser 28F to reverse osmosis desalination plant 52F is driven directly by organic vapor turbine 24F. Alternatively, reverse osmosis pump 53F can be driven by steam turbine 21F. Apart from that, the rest of the embodiment is the same as that described with reference to FIG. 2. In a still further alternative, related to this embodiment, a standby diesel engine or gas engine can be connected to steam turbine 21F or organic vapor turbine 24F via a suitable clutch. Furthermore, the relative and absolute component sizing can be adopted to suit the specific geothermal resource and water/electricity requirements.

Figure 8:
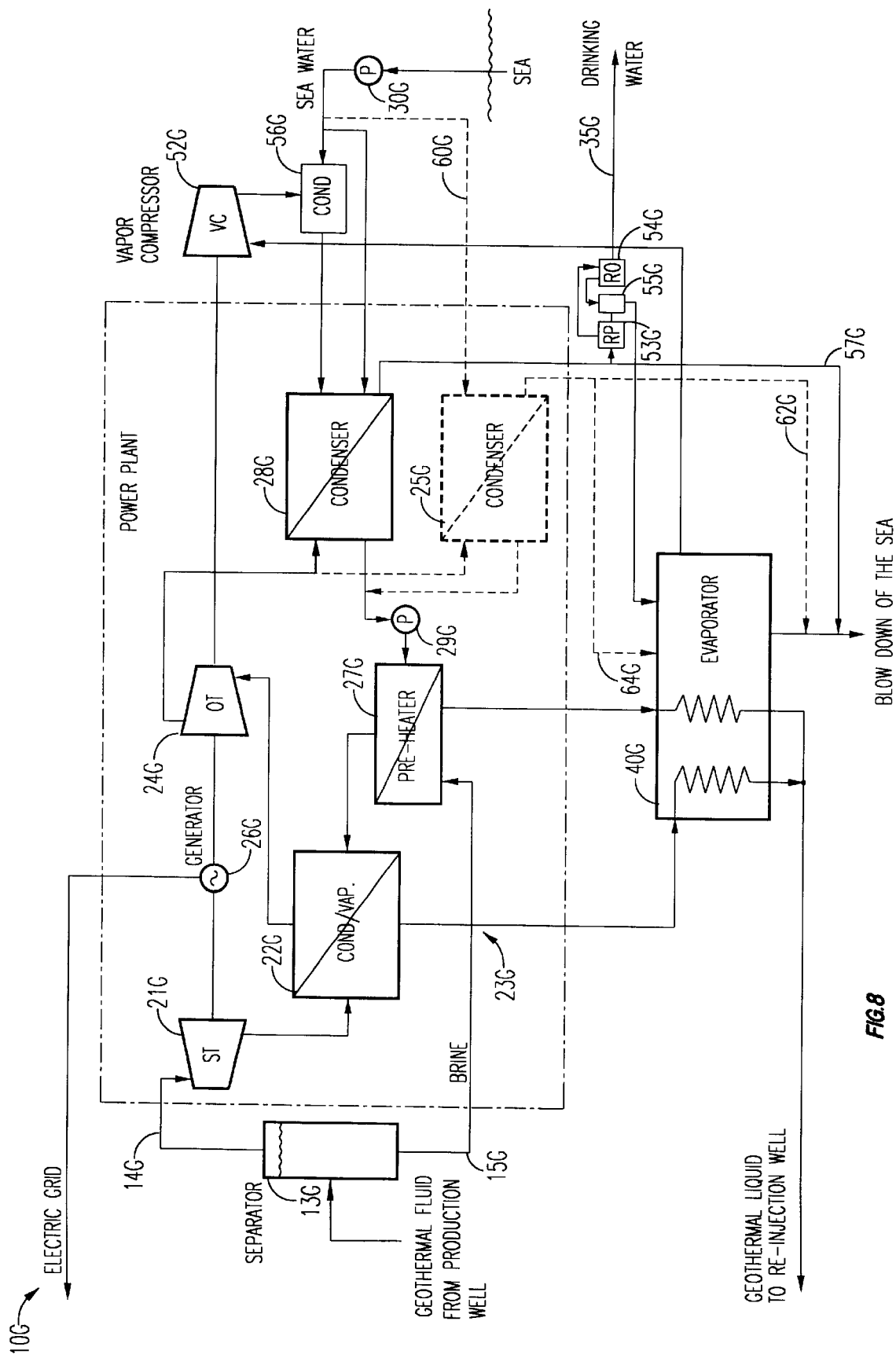
FIG. 8 is a schematic diagram of even a further combined geothermal power and desalination plant constructed and arranged in accordance with the present invention.

Turning to FIG. 8, numeral 10G designates even a further combined geothermal power and desalination plant constructed and arranged in accordance with the present invention. In this embodiment, which is similar to the embodiment described with reference FIG. 7 and in particular to the embodiment described with relation to FIG. 6, combined geothermal power and desalination plant 10G includes both vapor compressor 52G for producing desalinated or drinking water 36G via condenser 54G as well as reverse osmosis desalination plant 50G. However, in the present embodiment, blow down from reverse osmosis desalination plant 50G is supplied to evaporator 40G, portion of the desalination plant. Water vapor produced by evaporator 40G is supplied to vapor compressor 52G and the compressed water vapor is then supplied to condenser 56G, portion of the desalination plant, such that desalination or drinking water produced in line 58G is supplied to line 35G of desalinated, drinking or fresh water. Apart from that, this embodiment operates in a very similar manner to that described with reference to FIG. 6. Furthermore, pump 30G supplies sea water to condenser 54G and the heated sea water exiting this condenser is supplied to organic vapor condenser 28G for condensing expanded organic vapor exiting organic vapor turbine 24G. However, if preferred, portion of the sea water can bypass, via line 51G, condenser 56G. Further heated sea water exiting organic vapor condenser 28G is supplied to reverse osmosis desalination plant pump 53G that supplies the further heated sea water to reverse osmosis desalination plant 54G. In addition, portion of the further heated sea water is supplied via line 57G to the sea. Desalinated, drinking or fresh water produced in this reverse osmosis desalination plant is supplied to line 35G. Blow down exiting reverse osmosis desalination plant 54G is supplied to turbine 55G that runs reverse osmosis desalination plant pump 53G, the blow down exiting turbine 55G being supplied via line 59G to evaporator 40G, portion of the desalination plant. Water vapor produced by evaporator 40G is supplied to vapor compressor 52G and the compressed water vapor is then supplied to condenser 56G such that desalinated, drinking or fresh water produced in line 58G is supplied to line 35G of desalinated, drinking or fresh water. Optionally, organic vapor condenser 28G can be divided into two sections, 28G and 25G, in accordance with the heating load of the reverse osmosis desalination plant 54G in order that further heated sea water present in line 58G will receive a sufficient amount of heat to enhance desalinated, drinking or fresh water production while, on the other hand, does not damaging the membranes included in reverse osmosis designation plant 54G. The extra heat is extracted via organic vapor condenser 25G. In this option, portion of the sea water is supplied via line 60G to organic vapor condenser 25G and the heated sea water exiting this organic vapor condenser is extracted to the sea via line 62G. Furthermore, in an additional option, heated sea water exiting organic vapor condenser 25G can be supplied to evaporator 40G via line 64G in order add heat to this evaporator. Furthermore, in a further option in this embodiment, reverse osmosis pump 53G can be driven by organic vapor turbine 24G in addition to or instead of vapor compressor 52G. Also here, rather than organic vapor turbine 24G driving vapor compressor 52G and/or reverse osmosis pump 53G, steam turbine 21G can drive them.

In a further alternative, rather than using multi-stage or flash desalination plants 40 and 40B in the embodiments described with reference to FIGS. 1 and 3 respectively, reverse osmosis desalination plants can be used instead of multi-stage or flash desalination plants 40 and 40B. In these alternatives, the rest of the embodiments are constructed and arranged and operate in the same manner as described with reference to FIGS. 1 and 3.

In a still further alternative, the metering or control valve described with reference to FIGS. 2, 4 and 7, 32A, 32C and 32F respectively, can be used for modifying the ratio of electricity/water as needed.

Moreover, water can be stored to enable daily/weekly or seasonable adjustment of the electricity/water produced.

Furthermore, in the embodiments described with reference to FIGS. 2, 4 and 7 instead of using reverse osmosis desalination plants, electrodialysis (ED) desalination plants can be used. Usually, the use of the electrodialysis (ED) desalination plants rather than the use of reverse osmosis desalination plants will depend on the size of the desalination plants. More often that not, electrodialysis (ED) desalination plants will be used when a relatively small amount of desalinated water is needed while reverse osmosis desalination plants will be used when a relatively large amount of desalinated water is needed.

In addition, while all the embodiments describe portion of the geothermal fluid or the heat depleted geothermal fluid indirectly transferring heat to the flash distillation or multi-stage desalination plants, if preferred, the geothermal fluid or heat depleted geothermal fluid can also be flashed, e.g. in the first or first and second flash stage so as to directly transfer heat to the desalination plant. Moreover, the geothermal fluid exiting the stage or stages can be combined with heat depleted fluid exiting the geothermal power plant and used directly or indirectly in a further stage of distillation in the flashing desalination plant.

Moreover, while FIGS. 5, 6 and 8 show evaporators 40D, 40E and 40G respectively as receiving heat from heat depleted geothermal brine and geothermal steam condensate, not all of the heat available in these liquids has to be used in the evaporators. Thus, only portion of the heat available in these liquids can be used in addition to the heat available in vapor compressors 52D, 52E and 52G respectively.

Preferably, the organic working fluid in the organic Rankine cycle turbines described with reference to the drawings is pentane or iso-pentane. Furthermore, while geothermal power plant 20 is shown in FIG. 1 as an organic Rankine cycle turbine plant, geothermal power plant 20 can be a closed cycle steam turbine plant. Moreover, if preferred, geothermal power plant 20 can be an ammonia cycle geothermal power plant.

Also, if preferred, heat contained in the exhaust gases of diesel generators and gas turbines can be used in combination with the apparatus of the present invention and in particular with the embodiments described with reference to the figures described above for producing electricity and desalinated or drinking water using the power plants, e.g. organic Rankine cycle turbine power plants, and desalination units described above. For example, such heat can be added to the geothermal fluid supplied to geothermal power plant 20 shown in FIG. 1. Alternatively, such heat can be added to the geothermal steam exiting production well 12C of FIG. 4 for example. In a further alternative, such heat can be added to the organic fluid on the evaporator side of a vaporizer or condenser/evaporator e.g. vaporizer 22, 22B or condenser/evaporator 22A, 22D, 22E or 22F. In a still further alternative, such heat can be added to superheat the organic working fluid in the cycles described above with reference to the drawings. Moreover, such heat can be added to sea water such that a high temperature evaporator can be used for producing drinking water or desalinating the sea water. If preferred, this heat can be added to the sea water while using evaporators 40D or 40E described with reference to FIGS. 5 and 6 respectively.

It is believed that the advantages and improved results furnished by the method and apparatus of the present invention are apparent from the foregoing description of the invention. Various changes and modifications may be made without departing from the spirit and scope of the invention as described in the claims that follow.

What is claimed is:

1. Apparatus for producing power and desalinated water from geothermal fluid comprising:
    a) a geothermal power plant that produces power from geothermal fluid supplied thereto;
    b) means for supplying sea water to the condenser of said geothermal power plant that produces heated sea water;
    c) a desalination plant to which heated seal water is supplied and which produces drinking water.

2. Apparatus according to claim 1 wherein the geothermal power plant that produces power comprises an organic Rankine cycle geothermal power plant that produces power.

3. Apparatus according to claim 1 wherein the geothermal power plant that produces power comprises an organic combined cycle Rankine cycle geothermal power plant that produces power.

4. Apparatus according to claim 1 wherein the geothermal power plant that produces power comprises a closed cycle steam geothermal power plant that produces power.

5. Apparatus according to claim 1 wherein the geothermal power plant that produces power comprises an ammonia cycle geothermal power plant that produces power.

6. Apparatus according to claim 1 wherein the desalination plant comprises a multi-flash desalination plant.

7. Apparatus according to claim 1 wherein the desalination plant comprises a reverse osmosis desalination plant.

8. A method for producing power and desalinated water from geothermal fluid comprising the steps of:
    a) supplying geothermal fluid to a geothermal power plant that produces power;

b) supplying sea water to the condenser of said geothermal power plant that produces heated sea water;

c) supplying the heated sea water to a desalination plant that produces drinking water.

9. A method according to claim 8 wherein the step of supplying geothermal fluid to a geothermal power plant that produces power includes supplying geothermal fluid to an organic Rankine cycle geothermal power plant that produces power.

10. A method according to claim 8 wherein the step of supplying geothermal fluid to a geothermal power plant that produces power includes supplying geothermal fluid to an organic combined cycle Rankine cycle geothermal power plant that produces power.

11. A method according to claim 8 wherein the step of supplying geothermal fluid to a geothermal power plant that produces power includes supplying geothermal fluid to a closed cycle steam geothermal plant that produces power.

12. A method according to claim 8 wherein the step of supplying geothermal fluid to a geothermal power plant that produces power including supplying geothermal fluid to an ammonia cycle geothermal power plant that produces power.

13. A method according to claim 8 wherein the step of supplying the heated sea water to a desalination plant includes the step of supplying the heated sea water to a multi-flash desalination plant.

14. A method according to claim 8 wherein the step of supplying the heated sea water to a desalination plant includes the step of supplying the heated sea water to a reverse osmosis desalination plant.

15. Apparatus according to claim 3 wherein the organic combined cycle Rankine cycle geothermal power plant that produces power comprises a steam turbine that produces power from geothermal steam produced from the geothermal fluid, and an organic vapor turbine that produces power.

16. A method according to claim 10 including supplying geothermal steam produced from the geothermal fluid to a steam turbine that produces power and supplying organic working fluid vapor, produced by condensing expanded steam exiting the steam turbine, to an organic vapor turbine that produces power.

17. Apparatus according to claim 2 wherein the working fluid of said organic Rankine cycle geothermal power plant comprises pentane.

18. Apparatus according to claim 2 wherein the working fluid of said organic Rankine cycle geothermal power plant comprises iso-pentane.

19. Apparatus according to claim 3 wherein the working fluid of said organic combined cycle Rankine cycle geothermal power plant comprises pentane.

20. Apparatus according to claim 3 wherein a working fluid of said organic combined cycle Rankine cycle geothermal power plant comprises iso-pentane.

* * * * *